(12) United States Patent
Cherukuri et al.

(10) Patent No.: US 8,683,136 B2
(45) Date of Patent: Mar. 25, 2014

(54) APPARATUS AND METHOD FOR IMPROVING DATA PREFETCHING EFFICIENCY USING HISTORY BASED PREFETCHING

(75) Inventors: Naveen Cherukuri, San Jose, CA (US); Mani Azimi, Menlo Park, CA (US)

(73) Assignee: Intel Corporation, Santa Clara, CA (US)

(*) Notice: Subject to any disclaimer, the term of this patent is extended or adjusted under 35 U.S.C. 154(b) by 604 days.

(21) Appl. No.: 12/976,775

(22) Filed: Dec. 22, 2010

(65) Prior Publication Data

US 2012/0166733 A1  Jun. 28, 2012

(51) Int. Cl.
  *G06F 12/00* (2006.01)
(52) U.S. Cl.
  USPC ........... 711/137; 711/154; 711/156; 711/158; 711/221
(58) Field of Classification Search
  USPC .......................... 711/137, 154, 156, 158, 221
  See application file for complete search history.

(56) References Cited

U.S. PATENT DOCUMENTS

| | | | | |
|---|---|---|---|---|
| 6,088,449 A * | 7/2000 | Atalla | ............... | 380/273 |
| 6,374,370 B1 * | 4/2002 | Bockhaus et al. | ............... | 714/39 |
| 6,973,547 B2 * | 12/2005 | Nilsson et al. | ............... | 711/141 |
| 7,464,250 B2 * | 12/2008 | Dayan et al. | ............... | 711/217 |
| 2004/0073858 A1 * | 4/2004 | Cheung | ............... | 714/732 |
| 2004/0088638 A1 * | 5/2004 | Cheung | ............... | 714/774 |
| 2008/0016273 A1 * | 1/2008 | Dayan et al. | ............... | 711/112 |
| 2009/0049255 A1 * | 2/2009 | Dayan et al. | ............... | 711/154 |
| 2011/0320762 A1 * | 12/2011 | Soares et al. | ............... | 711/207 |

* cited by examiner

*Primary Examiner* — Stephen Elmore
(74) *Attorney, Agent, or Firm* — Blakely, Sokoloff, Taylor & Zafman LLP

(57) ABSTRACT

An apparatus and method are described for performing history-based prefetching. For example a method according to one embodiment comprises: determining if a previous access signature exists in memory for a memory page associated with a current stream; if the previous access signature exists, reading the previous access signature from memory; and issuing prefetch operations using the previous access signature.

27 Claims, 6 Drawing Sheets

Stream Record Table 100

| Stream Address 151 | Prior L1 Miss Index 152 | Prefetch Index 153 | Adj 154 | Dir 155 | Previous Access Signature 156 | Current Access Signature 157 | Stream Prefetch Enable 158 |
|---|---|---|---|---|---|---|---|
| Stream Address 1 | Prior L1 Miss Index 1 | Prefetch Index 1 | Adj 1 | Dir 1 | Previous Signature 156a | Current Signature 157a | Enable 158a |
| Stream Address 2 | Prior L1 Miss Index 2 | Prefetch Index 2 | Adj 2 | Dir 2 | Previous Signature 156b | Current Signature 157b | Enable 158b |
| Stream Address 3 | Prior L1 Miss Index 3 | Prefetch Index 3 | Adj 3 | Dir 3 | Previous Signature 156c | Current Signature 157c | Enable 158c |
| Stream Address 4 | Prior L1 Miss Index 4 | Prefetch Index 4 | Adj 4 | Dir 4 | Previous Signature 156d | Current Signature 157d | Enable 158d |

APPARATUS AND METHOD FOR IMPROVING DATA PREFETCHING EFFICIENCY USING HISTORY BASED PREFETCHING

BACKGROUND

1. Field of the Invention

This invention relates generally to the field of computer processors. More particularly, the invention relates to an apparatus and method for improving data prefetching efficiency with history based prefetching.

2. Description of the Related Art

Many modern microprocessors have large instruction pipelines that facilitate high speed operation. "Fetched" program instructions enter the pipeline, undergo operations such as decoding and executing in intermediate stages of the pipeline, and are "retired" at the end of the pipeline. When the pipeline receives a valid instruction and the data needed to process the instruction each clock cycle, the pipeline remains full and performance is good. When valid instructions are not received each cycle and/or when the necessary data is not available the pipeline may stall and performance can suffer. For example, performance problems can result from branch instructions in program code. If a branch instruction is encountered in the program and the processing branches to the target address, a portion of the instruction pipeline may have to be flushed, resulting in a performance penalty. Moreover, even with sequentially executed (i.e., non-branch) instructions, modern microprocessors are much faster than the memory where the program is kept, meaning that the program's instructions and data cannot be read fast enough to keep the microprocessor busy.

System performance may be enhanced and effective memory access latency may be reduced by anticipating the needs of a processor. If the data and instructions needed by a processor in the near future are predicted, then the data and instructions can be fetched in advance or "prefetched", such that the data/instructions are buffered/cached and available to the processor with low latency. A prefetcher that accurately predicts a READ request (such as, for example, for a branch instruction) and issues it in advance of an actual READ can thus, significantly improve system performance. Prefetchers can be implemented in a CPU or in a chipset, and prefetching schemes have been routinely used for both.

Prefetching may be performed at various levels of a CPU's cache hierarchy. For example, some current x86-based processors include a Level 2 (L2) cache stream prefetcher to reduce the number of L2 and lower level (e.g., L3) cache misses. The stream prefetcher predicts future accesses within a memory page based on the order of accesses within that page and the distance between subsequent accesses. However, current prefetching techniques do not retain a history of past accesses within a memory page and use this information to predict and prefetch data and/or instructions.

Thus, what is needed is an improved prefetching technique which relies (at least in part) on the history of past accesses within a memory page.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

A history based prefetching scheme, sometimes referred to below as a "page prefetching", identifies future accesses within a memory page based on first demand access to the page. In one embodiment of the invention, all prefetch candidates thus identified may be "bulk prefetched" following first demand miss, or can be sequenced to match prefetcher issue bandwidth in a given implementation. Although a physical page is a convenient granularity for describing embodiments of the prefetcher, the structures and mechanisms described herein would be applicable to any large contiguous physical address region. Consequently, the underlying principles of the invention are not limited to any particular physical address size or page size. Furthermore, these schemes may also be employed using virtual addresses.

In one embodiment of the invention, a commonly used stream prefetcher is augmented with a page prefetcher as described herein, owing to synergistic hardware structures used, to enhance prefetching efficiency (measured in terms of cache miss rate reduction and memory traffic, both of which are summarized below). The augmented prefetcher is sometimes referred to herein as SPATTERN (Spatial and PATTERN), indicating the combination of spatial and pattern based prefetching.

Figure 1A:
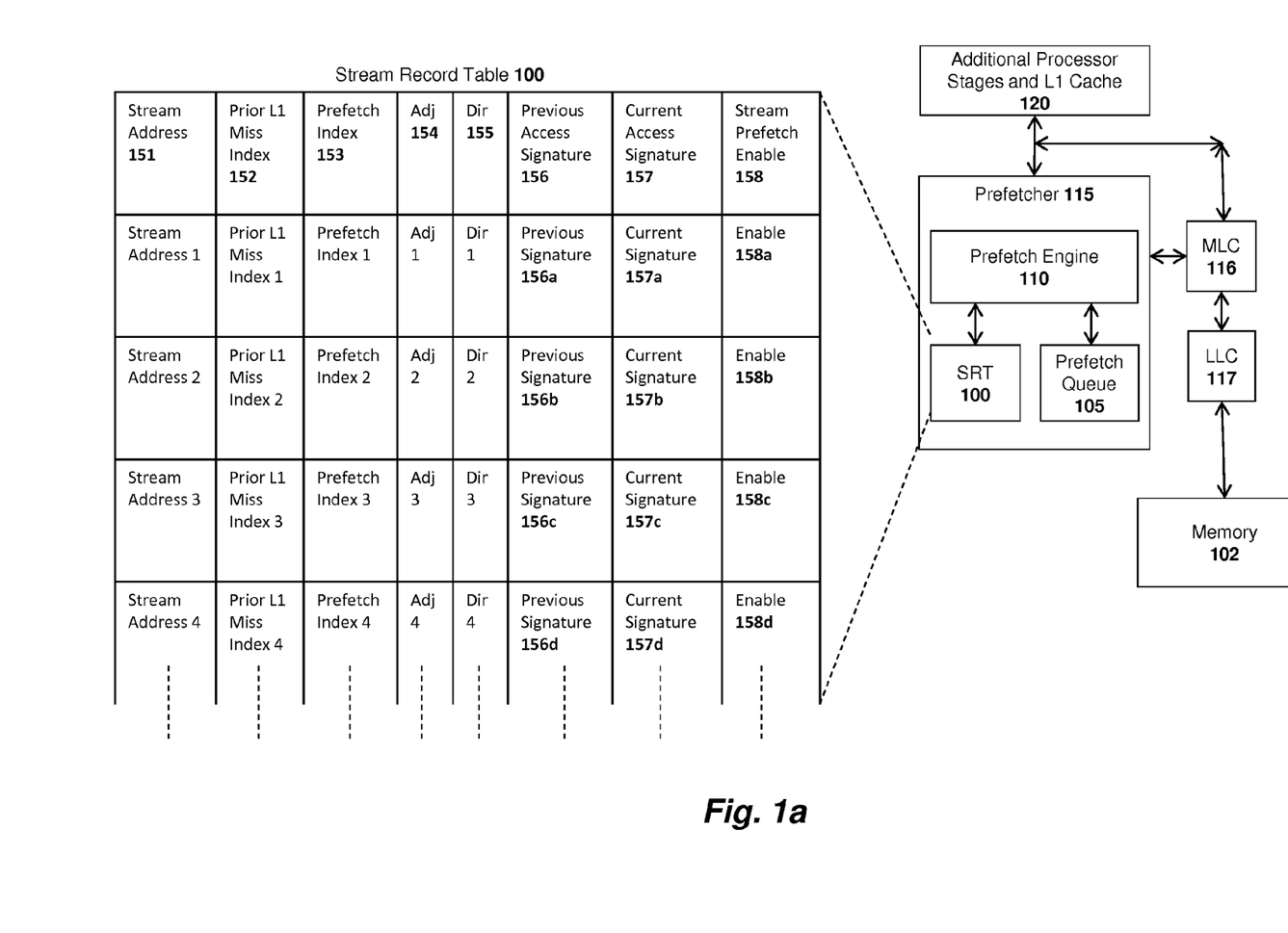
FIGS. 1a-b illustrates one embodiment of a processor architecture for performing page prefetch operations.
Figure 1B:
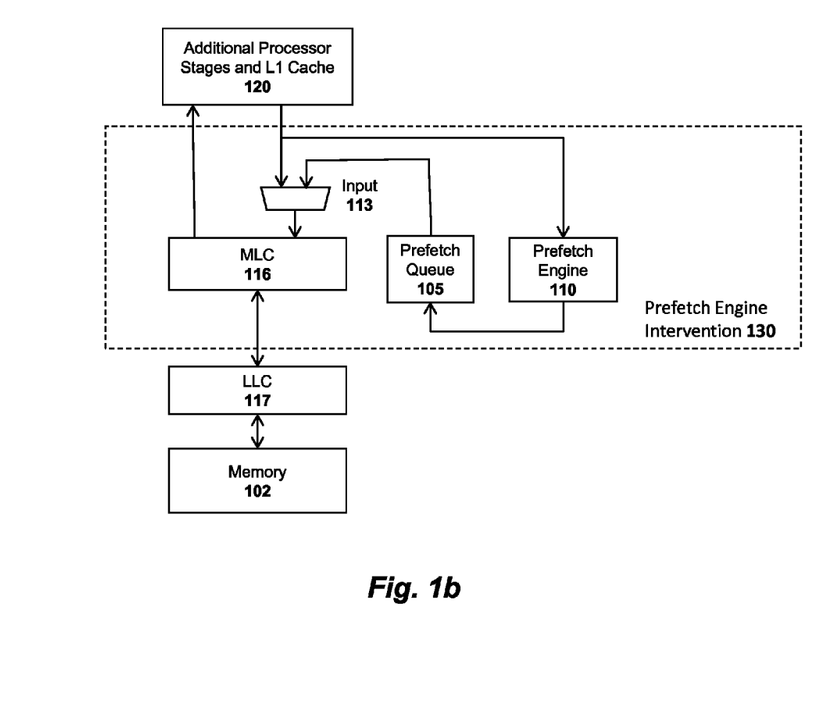

As illustrated in FIG. 1a, an exemplary processor in which the embodiments of the invention may be implemented includes a prefetcher 115 with a prefetch engine 110 for performing the various operations described herein. As illustrated in greater detail in FIG. 1b, the addresses of instructions and/or data chosen for prefetching by the prefetcher 115 may be temporarily buffered in a prefetch queue and subsequently issued to mid level cache (MLC) 116, which performs actual prefetching of data from higher levels in cache/memory hierarchy. A last level cache (LLC) 117 and a memory 102 are also illustrated in FIGS. 1a-b. In one embodiment, the prefetch engine 110 includes logic for performing stream prefetch operations and page prefetch operations based on signatures, as described below.

In one embodiment, the LLC cache 117 is a level 3 cache (L3) and the MLC 116 is a level 2 cache (L2). However, the underlying principles of the invention are not limited to any particular hierarchical placement of the caches 116 and 117. In addition, while the caches are shown integrated within the processor 190 in FIGS. 1a-b, the caches may be located on a chip separate from the processor chip while still complying with the underlying principles of the invention. Additionally, although not shown in FIG. 1a, the processor may include a higher level cache (e.g., a level 1 (L1) cache)) for storing the instructions and/or data. Additionally, each cache level in the hierarchy illustrated in FIGS. 1a-b could be split into distinct instruction and data caches, or can be aggregated into one unified cache storing both instructions and data. Furthermore, MLC and LLC can be private to a core, or in a multicore processor, either both, or just the LLC may be shared by more than one processor. The specific caching policy implemented at the various cache levels is well known and is beyond the scope of the present application.

In one embodiment of the invention, illustrated in FIG. 1a-b, a stream record table (STR) 100 stores access signatures 156-157 for each 4 KB page in memory, and a stream prefetch enable 158 field representing if stream prefetching should be done instead of page prefetching. In one embodiment, the access signatures 156-157 are 64-bit values and each bit of a signature corresponds to one cache line in the memory page (4 KB=64$ lines). A bit value of one in the access signatures implies that the corresponding cache line was accessed in the past. Stream prefetch enable 158 is a 1 bit value for selecting between stream prefetching (bit value of 1) and page prefetching (bit value of 0). The stream record table 100 contains multiple stream records (one shown in each row of the table), each issuing prefetches within a 4 KB contiguous physical address region.

As mentioned above, the prefetch engine 110 includes logic for performing stream prefetch operations and page prefetch operations based on signatures. Stream prefetch operations will be described first, followed by a description of page prefetch operations. The portions of the stream record table 100 used for stream prefetch operations include the stream address 151, the prior L1 miss index 152, prefetch index 153, an "Adj" bit 154, and a "Dir" bit 155.

During stream prefetching, the prefetcher 115 prefetches cache lines either into the MLC 116 or into the LLC 117. The example in FIG. 1-b shows a prefetch engine intervening intervention 130 between L1 cache and rest of the cache hierarchy, but a similar scheme can be employed between processor and cache hierarchy (including L1).

During normal operation, L1 misses are sent to and serviced by MLC 116. In parallel, this information is also sent to the prefetch engine 110 to identify potential prefetch candidates and fetch them either into MLC 116 or LLC 117. Later sections describe the conditions under which prefetch target is chosen in the present scheme.

In one embodiment, the prefetch engine 110 is responsible for detecting patterns, based on L1 miss activity, and triggering prefetches when reasonable confidence levels are reached. The lines identified by prefetch engine 110 are entered into prefetch queue 105, and are subsequently issued into cache hierarchy starting at MLC 116 (as shown in greater detail in FIG. 1b) via input 103. In one embodiment, the prefetch queue consists of a list of entries aligned at cache line address, and a 1-bit information specifying the prefetch target (either the MLC 116 or LLC 117). If a prefetch request hits in the MLC 116 (i.e., the line is found in the MLC), no action is taken. If it hits in the LLC 117 and the prefetch target is the MLC 116, the line is brought from the LLC into the MLC. Depending on the cache organization, the line is either retained in the LLC, or invalidated, or biased for eviction. If the line is not found in the MLC 116 or the LLC 117, it is fetched from memory and allocated in the prefetch target— either the MLC 116 or the LLC 117. If the prefetch target is the MLC 116, depending on the cache policies, the line may also be allocated in the LLC 117. The embodiments described herein may be implemented without the MLC (i.e., the operations pertaining to the MLC only will not exist in such a case).

The prefetch engine 110 issues prefetches into prefetch queue 105 when a certain confidence level is reached. To this end, the prefetch engine 110 employs the stream record table 100 structure mentioned above consisting of a list of stream records. Each stream record has a stream address 151. As an example, this could be the address of a 4 KB physical page, if prefetching is done on 4 KB physical page streams. Associated with each record is state information that is dynamically updated with each L1 miss, and is used to indicate confidence levels for issuing prefetches.

The state information contains the address of the most recent L1 miss address 152. Since a record already has a region address, the prior address field tracks a cache line in this stream using an offset into the region. For example, with 64 byte cache lines and 4 KB streams, a 6 b prior address can uniquely identify one of the 64 cache lines in a 4 KB page. The prefetch index 153 is also an index in the region, similar to L1 miss address, and is used as a reference address for issuing stream prefetches. The adjacent ("adj") bit 154 indicates if the prior address and the one before that are consecutive. The direction ("dir") bit 155 indicates the direction of the accesses. For instance, this bit is set to 1 if prior address is numerically greater than prior to prior address, otherwise this bit is set to 0. A more aggressive prefetcher may replace adj bit 154 with a counter that detects the difference between prior address and prior to prior address (counted in cache lines).

When a new L1 miss is encountered, the corresponding stream record is accessed. Using this new address and the prior address, new "adj" 154 and "dir" 155 bits are computed. If these values agree with stored "adj" 154 and "dir" 155 bits, the prefetcher assumes that a prefetch stream has been detected with confidence. The next (previous) "n" cache lines in this stream, starting with the line after (before) prefetch index 153, are placed into prefetch queue if the direction bit 154 is set to 1 (0). The value "n" can be parameterized in a given implementation (e.g., n=2 cache lines). Once the prefetch addresses are placed in the queue, the stream record within the stream record table 100 is updated as follows. The prefetch index 153 is set to the last issued prefetch. The prior L1 miss index address 152 is replaced with the incoming address. There is no need to update "adj" and "dir" bits, 154 and 155, respectively, as they match the values already stored in the stream record.

It is possible that newly computed "adj" 154 and "dir" 155 bits do not agree with the values stored in stream record. In this case, the previously described prefetching operation is not done as this indicates a new pattern and hence prefetch confidence is low. In this case, stream record is updated as follows. "Adj" 154 and "dir" 155 bits are set using the difference between prior address and new incoming address. Following this, prior L1 miss index 152 is set to the incoming new address which will serve for assessing prefetch confidence levels for future requests. The prefetch index 153 is also set to the new incoming address.

The above sequence of operations assume that a new incoming address has a corresponding stream record in the stream record table 100. In the absence of this match, the oldest stream record may be replaced with a new stream record that corresponds to the new incoming address. Since this is the first access to this stream, stream address 151 is set to the region address corresponding to incoming address, prior L1 miss index 152 and prefetch index 153 are set to the index of the incoming address in this stream, "adj" 154 and "dir" 155 bits are cleared (e.g., set to 0).

One embodiment of the invention augments the above described stream prefetching operations with a page prefetcher that adds a history component to stride prefetching, explained below. Embodiments could implement variants of the stream prefetcher. For instance, if the "adj" bit 154 is replaced by a counter to track the difference (in cache lines) between adjacent addresses of a stream, the prefetcher is typically called a "stride" prefetcher. Also, instead of deriving prefetch confidence using all incoming addresses, a variant may choose to do these operations only if the incoming address is also an MLC miss. Furthermore, to gain better confidence, the number of prior addresses stored could be more than 1. In this case, "adj" 154 and "dir" 155 bits are stored for each successive pairs of prior addresses. Owing to space limitations it is impossible to list all variations of a stream prefetcher. One skilled in the art would easily comprehend all such variations as it relates to the present invention.

A stride prefetcher relies on regular patterns between successive addresses accessed in a region. This works well for scientific and media applications that operate on consecutive elements of arrays. However, this pattern may not be exhibited by modern objected-oriented applications that tend to access variables within an object in some random order. Although these variables may fall within a page, the order of accesses could be random. To address this limitation, embodiments of the invention described herein augment the stream prefetcher with page prefetching that remembers a history of all cache lines accessed in a page, regardless of the order, and uses this information to do the prefetching. State information is augmented to include the additional fields of previous access signature 156, current access signature 157, and stream prefetch enable 158.

In one embodiment, each stream record within the stream record table 100 includes a previous access signature value 156a-d read from memory, a current access signature value 157a-d which is generated by prefetch engine 110 as based on cache lines accessed during the stream record's lifetime and a stream prefetch enable bit 158a-d to select between stream prefetching and page prefetching. In operation, whenever a new stream (address region) is detected, the prefetch engine 110 allocates a new stream record to the stream record table 100. While the first demand miss for the stream (which caused the stream record allocation) is being serviced, the prefetch engine 110 also reads an access signature for this region from memory and stores it in the previous signature field 156. While the access signature from memory is outstanding, stream prefetch enable 158 is set to 1, allowing stream prefetching to continue. When previous access signature 156 is received from memory, stream prefetch enable 158 is cleared to 0, disallowing stream prefetching. Effectively, page prefetching continues for this region, henceforth, until stream prefetch enable 158 is set to 1 again in future. For design simplicity, some embodiments may chose not to set stream prefetch enable 158 to 1 while previous signature is being fetched from memory, and may lose prefetching opportunity for a short period of time until previous signature 156 is retrieved from memory.

Once a previous signature is available, the prefetch engine 110 may bulk prefetch all lines within this region, as indicated by the signature. If the number of lines to be prefetched is large, they can be sequenced in smaller chunks subject to prefetcher issue bandwidth and prefetch queue capacity. For instance, in the latter case, for every access within a region, the adjacent 2 lines can be selected for prefetching until all lines in previous access signature are exhausted.

Although page prefetching has been used to prefetch lines within a region, the operation continues as if stream prefetching is in effect. This implies stream record fileds 152-155 are updated every time an L1 miss access is seen by the prefetcher. However, the prefetch candidates identified by stream prefetch heuristics are discarded, since stream prefetch enable 158 is set to 0. This mechanism, also known as training stream prefetcher, ensures that stream prefetching can be effectively turned on instantaneously should page prefetching be deemed incorrect.

When a cache line accessed does not have the corresponding bit set in the previous signature 156, this is an indication that the previous signature is no longer reliable (e.g., resulting from application phase change). At this point stream prefetch enable bit 158 is set to 1 and prefetching is initiated on cache lines identified by the stream prefetch heuristic indicated by the corresponding state information in stream record fields 152-155. (as opposed to discarding them as mentioned above).

In one embodiment, every MLC 116 access also accesses the prefetcher 115. This mechanism may be used to generate the current access signature 156, marking all cache lines that have been accessed during the stream record's lifetime (i.e., by updating the corresponding bit within the current access signature). In one embodiment, when a stream record is de-allocated (evicted), this current signature is written back to memory and will be used for prefetching the next time this region is allocated in the stream record table 100.

The above description is adequate for single threaded applications. In one embodiment of the invention, extensions are provided to optimize for multi-threaded applications where the same application can be running on multiple cores sharing the LLC. In this case, each core will have its own stream record for the same address region. In one embodiment, access signatures are thread agnostic and are generated for each address region. Thus, the access signature in memory represents activity of multiple threads accessing the same region. Consequently, this signature should be made thrash proof as explained in the following steps.

In one embodiment, at the time of signature writeback (i.e., when a current signature is stored in memory as described above) the access signature in memory is re-read. If this signature does not match the previous signature in the stream record it implies some other thread has been using this region. This signature mismatch is called a signature conflict and results in a signature merge operation as described below. In this case, there are two options, depending on the target cache organization:

a) Subset Merge: This option is desirable for private LLCs, as it avoids spurious prefetching. The signature to be written back to memory contains bits common to the current signature 157 generated by the prefetcher 115 and the signature presently stored in memory.

b) Superset Merge: This option is suited for shared LLCs. The signature to be written back is the union of current signature 157 generated by the prefetcher 115 and the signature presently stored in memory. In this case, the thread that first accesses a region (in future) acts as a helper thread for remaining threads, as far as prefetching is concerned. Also, in this case, the prefetch operation is performed into the shared LLC 117 only; prefetching into the MLC 116 is ignored (although prefetch candidates identified by stream heuristics may continue to be used for MLC prefetching, when stream prefetch enable 158 is set for this region).

Since superset merge utilizes LLC prefetching only, an additional bit of information in the signature is used to indicate the prefetch target. In one embodiment, this is done by adding a 1-bit field to the signature indicating conflict. If this bit is set, then prefetching is done to LLC only. To keep the signature size at 64-bits (so that it can be packed neatly in memory, with 8 signatures sharing 64 B of storage space) a 65 b to 64 b compression may be performed on the signature. In this embodiment, the two least significant bits of the signature are fused into one. This "super bit" is then set to 1 if either of the corresponding cache lines is accessed. The 1 bit storage thus freed up is used to store signature conflict bit.

Thus, one embodiment of the invention adds two 64-bit signatures to each stream record, and a 1 b stream prefetch enable field for a total of 129-bits (approximately equal to 16 B or 16 bytes). For a stream record table 100 with 16 entries, this adds approximately 256 B (¼ KB) of storage, which is trivial compared to the miss rate reduction resulting from this scheme. On the memory side, this embodiment of the invention adds a modest 0.2% storage overhead, which is insignificant (1-bit for a 64-bit cache line).

The memory region containing signatures can be either operating system (OS) invisible or OS visible. The following is a summary of each embodiment:

a) OS Invisible: This does not require any changes to the OS, hence there are no external dependencies. During BIOS, firmware commandeers 0.2% of total memory for signature storage, which is not visible to the OS.

b) OS/VMM Visible: The signatures can be made OS/VMM visible for additional optimizations. such as better software prefetching. In this case, the compiler or runtime (VMM) can program access patterns within each region which can be prefetched by the hardware prefetcher. This mechanism has lower core issue bandwidth overhead than conventional software prefetch instructions (1 per 4 KB region instead of 1 per cache line as in software prefetch instructions).

Figure 2:
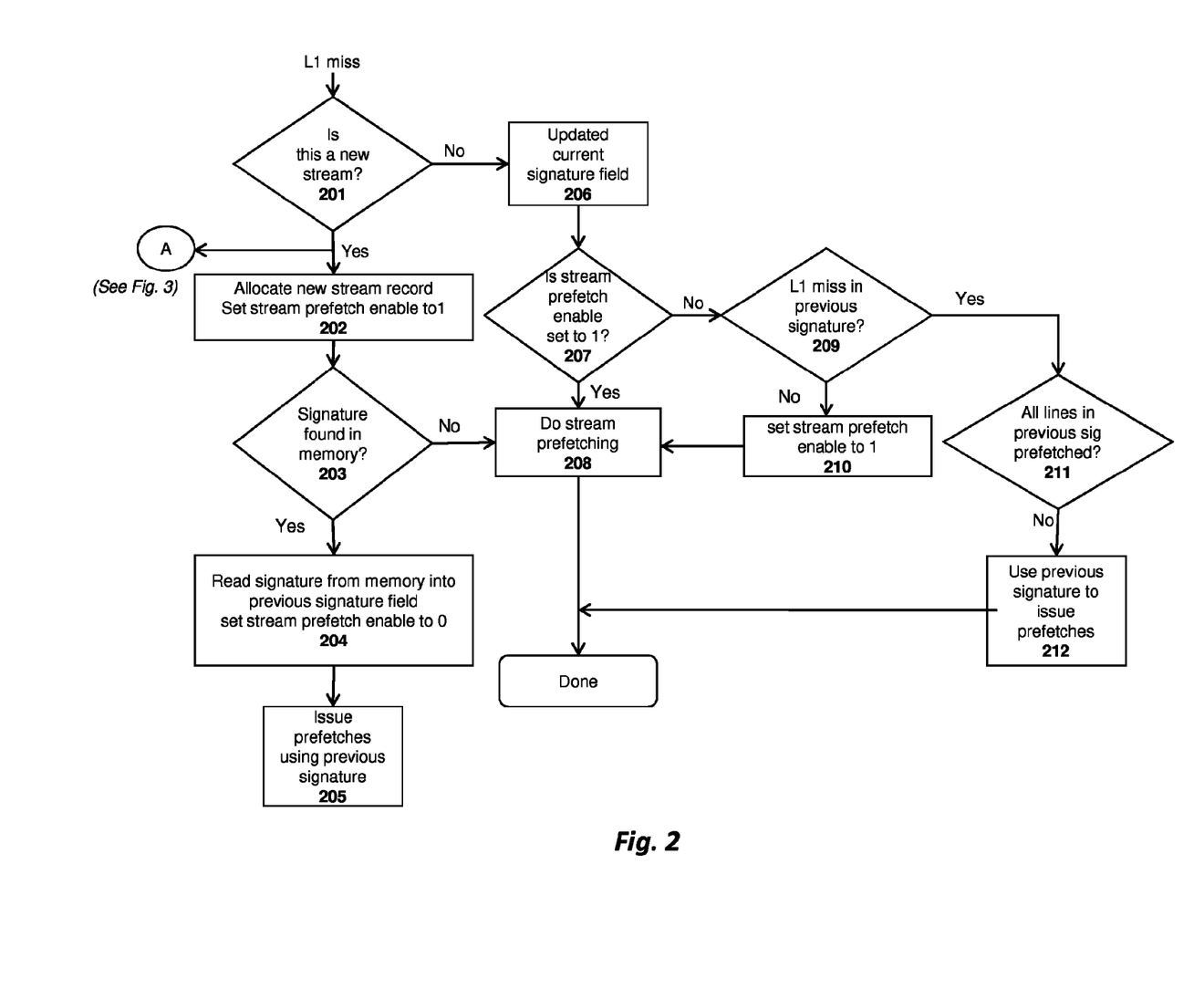
FIG. 2 illustrates a method for performing page prefetch operations according to one embodiment of the invention.
Figure 3:
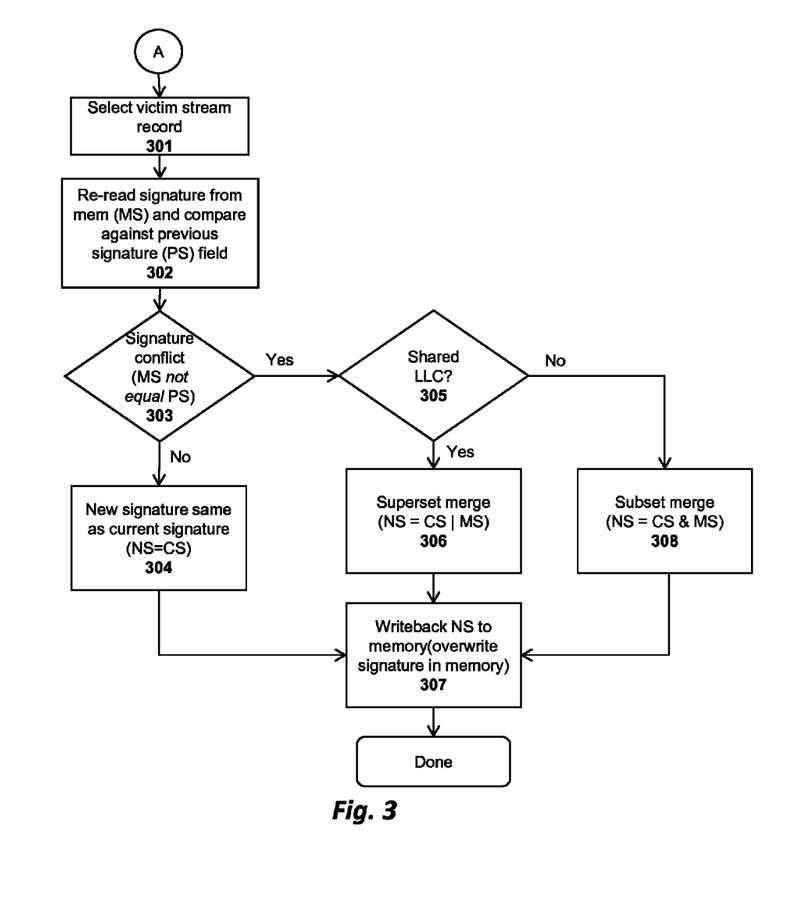
FIG. 3 illustrates a method for merging access signatures according to one embodiment of the invention.

One embodiment of a method for performing history based prefetching is illustrated in FIGS. 2 and 3. This method may be implemented within the context of the processor architecture shown in FIG. 1, but is not limited to any particular architecture.

Turning first to FIG. 2, following a level 1 (L1) cache miss, at 201 a determination is made as to whether the L1 cache miss is associated with a new stream. If so, then at 202 a new stream record is allocated, containing address information for the memory page associated with the new stream. Concurrently, stream prefetching fields 152-155 are updated and stream prefetch enable 158 is set to 1, indicating stream prefetching should be done until access signature is retrieved from memory. At 203 a determination is made as to whether an access signature for the page is stored in memory. If so, then at 204, the signature is read from memory and stored within the previous signature field 156 of the stream record in stream record table 100. Concurrently, stream prefetch enable 158 is cleared (set to 0) for this stream record, to indicate page prefetching is in effect. At 205, prefetches are issued using the previous signature.

Returning to 201, if this is not a new stream, then at 206 the current signature 157 stored for the stream record stored within the stream record table 100 is updated (e.g., updating bits associated with the accessed cache lines). At 207, a determination is made as to whether stream prefetch enable 158 of the stream record is set to 1. If so, then at 208, stream prefetching is performed. If not, then at 209, a determination is made as to whether the requested cache line is identified as accessed within the previous signature field 156. If so, then at 211, a determination is made as to whether all lines within the previous signature are prefetched and, if not, then at 212 page prefetching is used to issue the prefetches. If the line is not identified as accessed in the previous signature then, at 210, stream prefetch enable 158 is set to 1 for this record and stream prefetching is performed at 208.

One embodiment of a method for evicting entries from the stream record table is illustrated in FIG. 3. At 301, a victim stream record is selected. At 302, the signature associated with the stream record is re-read from memory and compared against the previous signature field of the stream record. If a signature conflict exists, determined at 303 (i.e., if the signatures do not match), then at 305, a determination is made as to whether the LLC is shared. If so, then a superset merge is performed at 306 (as described above). If not, then a subset merge is provided at 308 (as described above). In either case, at 307 the resulting signature is written back to memory, overwriting the existing signature. If a signature conflict does not exist at 303 (i.e., if the signatures match), then at 304, the new signature is set to be the same as the current signature 157 and at 307 the signature is written back to memory.

Thus, page prefetching as described above adds a new dimension to existing prefetching techniques by using past access history as a good indicator of future accesses to the same page. This implementation is not dependent on the order of cache lines accessed or their relative distance within a page.

Figure 4:
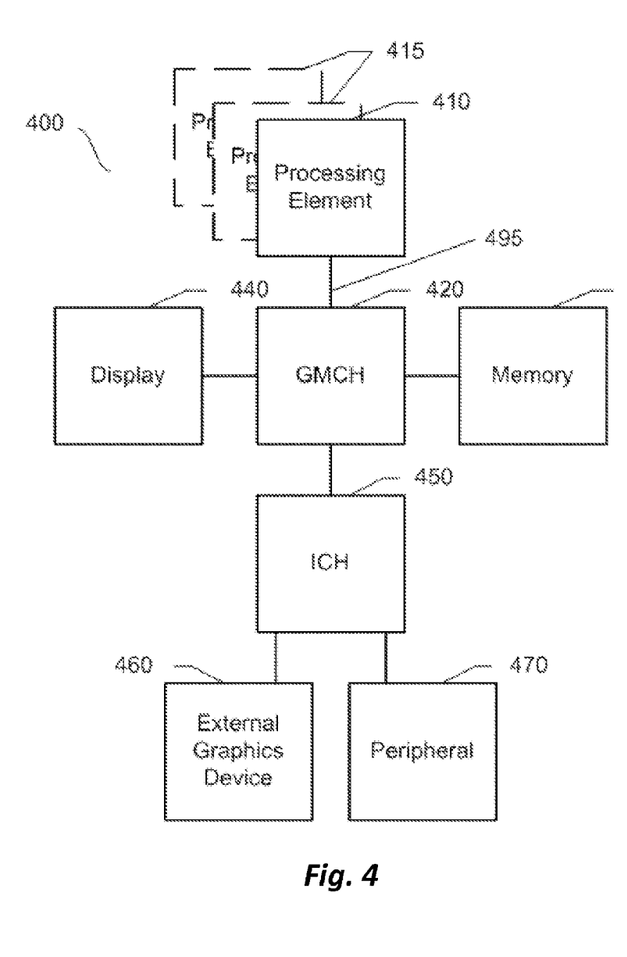
FIG. 4 illustrates a computer system on which embodiments of the invention may be implemented.

Referring now to FIG. 4, shown is a block diagram of another computer system 400 in accordance with one embodiment of the present invention. The system 400 may include one or more processing elements 410, 415, which are coupled to graphics memory controller hub (GMCH) 420. The optional nature of additional processing elements 415 is denoted in FIG. 4 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 4 illustrates that the GMCH 420 may be coupled to a memory 440 that may be, for example, a dynamic random access memory (DRAM). The DRAM may, for at least one embodiment, be associated with a non-volatile cache.

The GMCH 420 may be a chipset, or a portion of a chipset. The GMCH 420 may communicate with the processor(s) 410, 415 and control interaction between the processor(s) 410, 415 and memory 440. The GMCH 420 may also act as an accelerated bus interface between the processor(s) 410, 415 and other elements of the system 400. For at least one embodiment, the GMCH 420 communicates with the processor(s) 410, 415 via a multi-drop bus, such as a frontside bus (FSB) 495.

Furthermore, GMCH 420 is coupled to a display 440 (such as a flat panel display). GMCH 420 may include an integrated graphics accelerator. GMCH 420 is further coupled to an input/output (I/O) controller hub (ICH) 450, which may be used to couple various peripheral devices to system 400. Shown for example in the embodiment of FIG. 4 is an external graphics device 460, which may be a discrete graphics device coupled to ICH 450, along with another peripheral device 470.

Alternatively, additional or different processing elements may also be present in the system 400. For example, additional processing element(s) 415 may include additional processors(s) that are the same as processor 410, additional processor(s) that are heterogeneous or asymmetric to processor 410, accelerators (such as, e.g., graphics accelerators or digital signal processing (DSP) units), field programmable gate arrays, or any other processing element. There can be a variety of differences between the physical resources 410, 415 in terms of a spectrum of metrics of merit including architectural, microarchitectural, thermal, power consumption characteristics, and the like. These differences may effectively manifest themselves as asymmetry and heterogeneity amongst the processing elements 410, 415. For at least one embodiment, the various processing elements 410, 415 may reside in the same die package.

Figure 5:
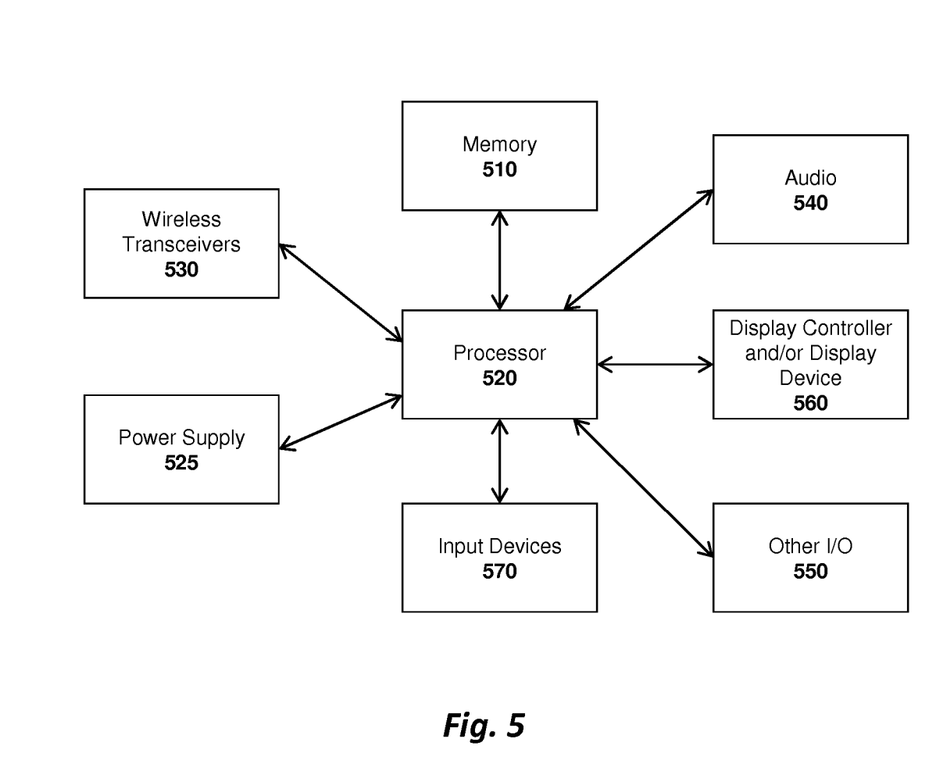
FIG. 5 illustrates another computer system on which embodiments of the invention may be implemented.

FIG. 5 is a block diagram illustrating another exemplary data processing system which may be used in some embodiments of the invention. For example, the data processing system 500 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 500 may be a network computer or an embedded processing device within another device.

According to one embodiment of the invention, the exemplary architecture of the data processing system 900 may used for the mobile devices described above. The data processing system 900 includes the processing system 520, which may include one or more microprocessors and/or a system on an integrated circuit. The processing system 520 is coupled with a memory 910, a power supply 525 (which includes one or more batteries) an audio input/output 540, a display controller and display device 560, optional input/output 550, input device(s) 570, and wireless transceiver(s) 530. It will be appreciated that additional components, not shown in FIG. 5, may also be a part of the data processing system 500 in certain embodiments of the invention, and in certain embodiments of the invention fewer components than shown in FIG. 55 may be used. In addition, it will be appreciated that one or more buses, not shown in FIG. 5, may be used to interconnect the various components as is well known in the art.

The memory 510 may store data and/or programs for execution by the data processing system 500. The audio input/output 540 may include a microphone and/or a speaker to, for example, play music and/or provide telephony functionality through the speaker and microphone. The display controller and display device 560 may include a graphical user interface (GUI). The wireless (e.g., RF) transceivers 530 (e.g., a WiFi transceiver, an infrared transceiver, a Bluetooth transceiver, a wireless cellular telephony transceiver, etc.) may be used to communicate with other data processing systems. The one or more input devices 570 allow a user to provide input to the system. These input devices may be a keypad, keyboard, touch panel, multi touch panel, etc. The optional other input/output 550 may be a connector for a dock.

Other embodiments of the invention may be implemented on cellular phones and pagers (e.g., in which the software is embedded in a microchip), handheld computing devices (e.g., personal digital assistants, smartphones), and/or touch-tone telephones. It should be noted, however, that the underlying principles of the invention are not limited to any particular type of communication device or communication medium.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a non-transitory machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method for performing history-based prefetch in a processor comprising:
   determining, via a prefetcher of the processor and by checking a stream record table, if a previous access signature exists in memory for a memory page associated with a current stream, wherein the stream record table includes a plurality of stream records, each record having a previous access signature and a current access signature identifying cache lines previously and currently accessed within a memory page, respectively;
   if the previous access signature exists, via the prefetcher of the processor,
   reading the previous access signature from memory; and
   issuing prefetch operations using the previous access signature.

2. The method as in claim 1 wherein if the previous access signature does not exist then performing stream prefetching operations.

3. The method as in claim 1 further comprising:
   initially determining if the stream is a new stream; and
   if the stream is a new stream, then performing the operations of determining if the previous access signature exists and, if so, then reading the signature from memory and issuing prefetch operations using the previous signature; and
   if the stream is not a new stream, then updating a current signature field associated with the stream.

4. The method as in claim 1 wherein an access signature comprises an N-bit field, each bit within the N-bit field associated with a particular cache line, wherein a first binary value for a bit in the N-bit field indicates that the cache line associated with that bit was previously accessed, and wherein a second binary value for that bit in the N-bit field indicates that the cache line associated with that bit was not previously accessed.

5. The method as in claim 4 wherein N=64.

6. The method as in claim 3 wherein if the stream is a new stream then performing the operations of:
   selecting a current access signature to be replaced with an access signature for the new stream;
   reading a previous access signature associated with the current signature from memory;

if the current access signature and previous access signature are not the same equal, then merging the current access signature and previous access signature to create a merged access signature.

7. The method as in claim 6 wherein merging comprises performing a superset merge.

8. The method as in claim 6 wherein merging comprises performing a subset merge.

9. The method as in claim 6 further comprising:
writing the merged access signature back to memory.

10. The method as in claim 1 further comprising:
enabling stream prefetching while determining if the previous access signature exists in memory and while waiting to receive the previous access signature from memory.

11. The method as in claim 10 further comprising disabling stream prefetching when the previous access signature is received from memory.

12. The method as in claim 1 further comprising:
continuously checking if a level-one cache miss address is in the previous access signature; and
if a level-one cache miss address is not in the previous access signature, then enabling stream prefetching even though page prefetching has been done for the memory region.

13. The method as in claim 12 wherein if page prefetching is in progress, it the page prefetching will be stopped in favor of stream prefetching.

14. An apparatus for performing history-based prefetching in a processor comprising:
a stream record table including a plurality of stream records, each record having a previous access signature and a current access signature identifying cache lines previously and currently accessed within a memory page, respectively; and
a prefetcher comprising a page prefetcher component, wherein in response to detecting a new stream, the page prefetcher performs the operations of:
adding a new stream record within the stream record table for the new stream; and
determining if a previous access signature exists in memory for a memory page associated with the new stream, wherein if the previous access signature exists, reading the signature from memory, storing the previous access signature within the stream record, and issuing prefetch operations using the previous access signature.

15. The apparatus as in claim 14 further comprising a streamer stream prefetcher component to perform stream-based prefetch operations if the previous access signature does not exist.

16. The apparatus as in claim 14 wherein the prefetcher performs the additional operations of:
initially determining if the stream is a new stream; and
if the stream is a new stream, then performing the operations of determining if the previous access signature exists and, if so, then reading the signature from memory and issuing prefetch operations using the previous signature; and
if the stream is not a new stream, then updating a current signature field in the record associated with the stream.

17. The apparatus as in claim 14 wherein an access signature comprises an N-bit field, each bit within the N-bit field associated with a particular cache line, wherein a first binary value for a bit in the N-bit field indicates that the cache line associated with that bit was previously accessed, and wherein a second binary value for a bit in the N-bit field indicates that the cache line associated with that bit was not previously accessed.

18. The apparatus as in claim 17 wherein N=64.

19. The apparatus as in claim 17 wherein if the stream is a new stream then the prefetcher performing the operations of:
selecting a current access signature to be replaced with an access signature for the new stream;
reading a previous access signature associated with the current signature from memory;
if the current access signature and previous access signature are not the same, then merging the current access signature and previous access signature to create a merged access signature.

20. The apparatus as in claim 19 wherein merging comprises performing a superset merge.

21. The apparatus as in claim 19 wherein merging comprises performing a subset merge.

22. The apparatus as in claim 19 further comprising:
writing the merged access signature back to memory.

23. The apparatus as in claim 14 further comprising:
enabling stream prefetching while determining if the previous access signature exists in memory and while waiting to receive the previous access signature from memory.

24. The method as in claim 3 further comprising disabling stream prefetching when the previous access signature is received from memory.

25. The method as in claim 3 further comprising:
continuously checking if a level-one cache miss address is in the previous access signature; and
if a level-one cache miss address is not in the previous access signature, then enabling stream prefetching even though page prefetching has been done for the memory region.

26. The method as in claim 25 wherein if page prefetching is in progress, it will be stopped in favor of stream prefetching.

27. A computer system comprising:
a display device;
a memory for storing instructions;
a processor for processing the instructions, the processor including an apparatus for performing history-based prefetching comprising:
a stream record table including a plurality of stream records, each record having a previous access signature and a current access signature identifying cache lines previously and currently accessed within a memory page, respectively; and
a prefetcher comprising a page prefetcher component, wherein in response to detecting a new stream, the page prefetcher performs the operations of:
adding a new stream record within the stream record table for the new stream; and
determining if a previous access signature exists in memory for a memory page associated with the new stream, wherein if the previous access signature exists, reading the signature from memory, storing the previous access signature within the stream record, and issuing prefetch operations using the previous access signature.

* * * * *